Patented Apr. 13, 1943

2,316,242

UNITED STATES PATENT OFFICE 2,316,242

PLASTICIZED CELLULOSE DERIVATIVE COMPOSITION

Winfrid Hentrich, Dusseldorf-Reisholz, Wilhelm Kaiser, Dessau in Anhalt, and Rudolf Endres, Dessau-Rosslau, Germany, assignors, by mesne assignments, to "Patchem A.-G. Zur Beteiligung An Patenten und Sonstigen Erfindungsrechten auf Chemische Verfahren," Zurich, Switzerland, a corporation of Switzerland No Drawing. Application October 13, 1938, Serial No. 234,780. In Germany October 13, 1937

11 Claims. (Cl. 106—186)

The present invention relates to improved cellulosic compositions containing aliphatic and cycloaliphatic sulfonamides as dissolving, softening, gelatinizing and swelling agents.

The following aliphatic sulfonamides are to be considered e. g.: propyl-sulfamide, butyl-sulfonamides, octyl-sulfamides, dodecyl-sulfamides, octadecyl-sulfonamides and the like; further—as cycloaliphatic sulfonamides e. g.: cyclohexyl-sulfonamide, methyl-cyclohexyl-sulfonamides or higher molecular alkylcycloalkyl-sulfonamides, decahydro-naphthyl-sulfonamide and the like. The hydrocarbon radicals of these sulfonamides may for the present purpose also contain atoms such as halogen, oxygen, sulfur or oxygen-, sulfur-, nitrogen-bearing atom groups or they may be of an unsaturated character such as hydroxypropyl-sulfonamide, the chlorobutyl-sulfonamide, the butoxy-ethyl-sulfonamide, the oleyl-sulfonamide, etc.

In accordance with this invention we apply these softening, gelatinizing and swelling agents either alone or mixed with one another or also mixed with other known dissolving and softening agents for the manufacture of lacquers, films and other shaped products, plastic masses and the like from cellulose esters such as nitro-cellulose, formyl-cellulose, acetyl-cellulose and the like or cellulose-ethers such as ethyl-, benzyl-cellulose and the like.

The aliphatic and cycloaliphatic sulfonamides used in the instant invention have a particularly good plasticizing effect and possess very remarkable fastness to light which features make them for the purposes of the invention far superior to the hitherto known aromatic sulfonamides.

Example 1

12 parts by weight of ethyl-cellulose (soluble in acetone, of a median viscosity) are dissolved in 15 parts by weight of acetone, 10 of methyl-alcohol, 10 of methyl-acetate, 10 of ethyl-acetate, 15 of benzol and 6 of methylene-chloride. Then 20 parts by weight of n-butyl-sulfonamide are stirred into this solution. The thus obtained final solution is applicable for the lacquering of cables and the coatings are readily drying and elastic.

Example 2

15 parts by weight of acetyl-cellulose (soluble in acetone, of a low viscosity) are dissolved in a solvents-mixture of 50 parts by weight of tetrahydro-furfuryl-alcohol, 10 of ethyl-alcohol and 20 of acetone. To this solution we add—as softening agent—a mixture of 6 parts by weight of n-butyl-sulfonamide and 3 parts by weight of n-dodecyl-sulfonamide. The thus obtained solution represents an acetyl-cellulose-lacquer giving well drying, fast and stable coatings.

Example 3

3 parts by weight of nitro-cellulose (of a high viscosity) are dissolved in a solvents-mixture of 22 parts by weight of butyl-acetate, 4 of butyl-alcohol and 11 of xylol. To this solution we add—as softening agent—2 parts by weight of methyl-cyclo-hexyl-sulfonamide. The resulting solution supplies a metal-preserving lac which, when dry, is hard, elastic and of a good fastness to light.

In the same manner such aliphatic or cycloaliphatic sulfonamides may be used the nitrogen atoms of which are substituted by one or two organic residues of the aliphatic, cyclo-aliphatic or mixed aliphatic-cycloaliphatic series which may contain heteroatoms or heteroatom groups as halogen, oxygen, sulfur or oxygen-, sulfur- or nitrogen-bearing atom groups.

Such N-substituted aliphatic or cycloaliphatic sulfonamides are e. g. butylsulfo-N-octadecylamide, octylsulfo-N-cyclohexylamide, butylsulfo-N-dibutylamide, methylsulfo-N-methyl-N-octadecylamide, dodecylsulfo-N-diaethylamide, octylsulfo-N-aethyl-N-cyclohexylamide, cyclohexylsulfo-N-dipropyl-amide, butylsulfo-N-chlorobutyl-N-octyl-amide, methylsulfo-N-dodecyloxy-methyl-amide, athylsulfo-N-oleylamide and the like.

Example 4

4.5 parts by weight of nitro-cellulose are dissolved in a mixture of solvents of 33 parts by weight of butyl-acetate, 6 parts by weight of butyl-alcohol and 16 weight parts of xylol. As softening agent to this solution 1.5 parts by weight of butylsulfo-N-octadecylamide and 1.5 parts by weight of cyclohexylsulfo-N-dibutyl-amide are added. The thus obtained solution represents a nitrocellulose-lacquer giving coatings of excellent fastness to light.

We claim:

1. A plastic composition having a base material primarily consisting of a cellulose derivative selected from the group consisting of cellulose esters and ethers and containing as a softening and plasticizing agent for said base material an agent selected from the group consisting of substantially water-insoluble aliphatic and cycloaliphatic monosulfonamides substituted on the nitrogen atom only by alkyl radicals.

2. A plastic composition comprising a cellulose derivative selected from the group consisting of cellulose esters and cellulose ethers and a softening and plasticizing agent selected from the group consisting of substantially water-insoluble aliphatic and cycloaliphatic monosulfonamides.

3. A plastic composition comprising a cellulose derivative selected from the group consisting of cellulose esters and cellulose ethers and as a softening and plasticizing agent an aliphatic monosulfonamide having substituted on its nitrogen atom at least one organic radical of the aliphatic, cycloaliphatic and aliphatic-cycloaliphatic group.

4. A plastic composition comprising a cellulose derivative selected from the group consisting of cellulose esters and cellulose ethers and as a softening and plasticizing agent a cycloaliphatic monosulfonamide having substituted on its nitrogen atom at least one organic radical of the aliphatic, cycloaliphatic and aliphatic-cycloaliphatic group.

5. A plastic composition comprising a cellulose derivative selected from the group consisting of cellulose esters and cellulose ethers and a softening and plasticizing agent selected from the group consisting of substantially water-insoluble aliphatic and cycloalkyl monosulfonamides, said sulfonamides being substituted on the nitrogen atom only by an alkyl radical.

6. A cellulosic lacquer stable to light comprising a cellulose derivative selected from the group consisting of cellulose esters and cellulose ethers and an alkyl monosulfonamide unsubstituted on its nitrogen atom.

7. A cellulosic lacquer stable to light comprising a cellulose nitrate as the basic ingredient and a cycloalkyl sulfonamide substituted on its nitrogen atom only by an alkyl radical.

8. A plastic composition having a base material primarily consisting of a cellulose derivative selected from the group consisting of cellulose esters and cellulose ethers and containing as a softening and plasticizing agent for said base material an agent selected from the group consisting of substantially water-insoluble unsubstituted aliphatic and cycloaliphatic monosulfonamides.

9. A cellulosic lacquer containing acetyl cellulose as a basic ingredient and an alkyl monosulfonamide unsubstituted on its nitrogen atom as a softening and plasticizing agent.

10. A plastic composition comprising a cellulose derivative selected from the group consisting of cellulose esters and cellulose ethers and as a softening and plasticizing agent a substantially water-insoluble aliphatic monosulfonamide.

11. A plastic composition comprising a cellulose derivative selected from the group consisting of cellulose esters and cellulose ethers and as a softening and plasticizing agent a substantially water-insoluble cycloaliphatic monosulfonamide.

WINFRID HENTRICH.
WILHELM KAISER.
RUDOLF ENDRES.